US008347525B2

(12) United States Patent
Gerde

(10) Patent No.: US 8,347,525 B2
(45) Date of Patent: Jan. 8, 2013

(54) SYSTEM AND METHOD FOR PRODUCING DRY FORMULATIONS

(75) Inventor: Per Gerde, Trosa (SE)

(73) Assignee: Inhalation Sciences Sweden AB, Stockholm (SE)

( * ) Notice: Subject to any disclaimer, the term of this patent is extended or adjusted under 35 U.S.C. 154(b) by 502 days.

(21) Appl. No.: 12/674,542

(22) PCT Filed: Sep. 24, 2008

(86) PCT No.: PCT/SE2008/051065

§ 371 (c)(1), (2), (4) Date: Feb. 22, 2010

(87) PCT Pub. No.: WO2009/041900

PCT Pub. Date: Apr. 2, 2009

(65) Prior Publication Data

US 2011/0100560 A1 May 5, 2011

Related U.S. Application Data

(60) Provisional application No. 60/974,501, filed on Sep. 24, 2007.

(51) Int. Cl.
*F26B 3/00* (2006.01)

(52) U.S. Cl. ......... 34/368; 34/443; 34/138; 128/203.15; 60/39.12; 204/155; 159/4.04; 159/48.1

(58) Field of Classification Search .................... 34/249, 34/359, 381, 368, 443, 497, 90, 138, 175; 159/4.04, 48.1; 204/155; 128/203.15
See application file for complete search history.

(56) References Cited

U.S. PATENT DOCUMENTS

| | | | | |
|---|---|---|---|---|
| 4,115,927 A * | 9/1978 | Rosensweig | .................... | 34/249 |
| 4,247,987 A * | 2/1981 | Coulaloglou et al. | .......... | 34/249 |
| 4,254,557 A * | 3/1981 | Mayer et al. | .................... | 34/249 |
| 4,254,558 A * | 3/1981 | Mayer | ............................ | 34/249 |
| 4,254,616 A * | 3/1981 | Siminski et al. | ............. | 60/39.12 |
| 4,310,973 A * | 1/1982 | King | .............................. | 34/368 |
| 4,489,503 A * | 12/1984 | Browne et al. | .................. | 34/368 |
| 4,896,436 A | 1/1990 | Iwaya et al. | | |
| 5,015,332 A | 5/1991 | Iwaya et al. | | |
| 6,003,512 A | 12/1999 | Gerde | | |
| 6,848,197 B2 * | 2/2005 | Chen et al. | ...................... | 34/373 |

(Continued)

FOREIGN PATENT DOCUMENTS

| | | |
|---|---|---|
| EP | 255760 B1 | 6/1988 |
| WO | 2008-153493 A1 | 12/2008 |
| WO | 2009-008830 A1 | 1/2009 |

*Primary Examiner* — Stephen M. Gravini
(74) *Attorney, Agent, or Firm* — Porter Wright Morris & Arthur LLP

(57) ABSTRACT

The invention relates to a spray drying system and a method for its operation that provides a composition of dry. or essentially solvent free, particles from a solution of an agent. The system comprises a generally vertical tube reactor arranged for counter-current removal of solvent from a process flow fed with aerosol droplets of solution descending from the top said reactor with an ascending gas flow. The reactor includes a perforated process tube for transportation of the process flow from the outlet of an aerosol generating device to a dry particle collecting device. A membrane sleeve essentially surrounds the peripheral area of said process tube and separates the descending process stream from the ascending gas stream. Vaporized solvent is transported from the process stream to the ascending gas stream. A reactor housing is sealingly covering said process tube and membrane sleeve and is provided with means for introducing and/or removing the process fluids.

33 Claims, 6 Drawing Sheets

U.S. PATENT DOCUMENTS

Figure 1:
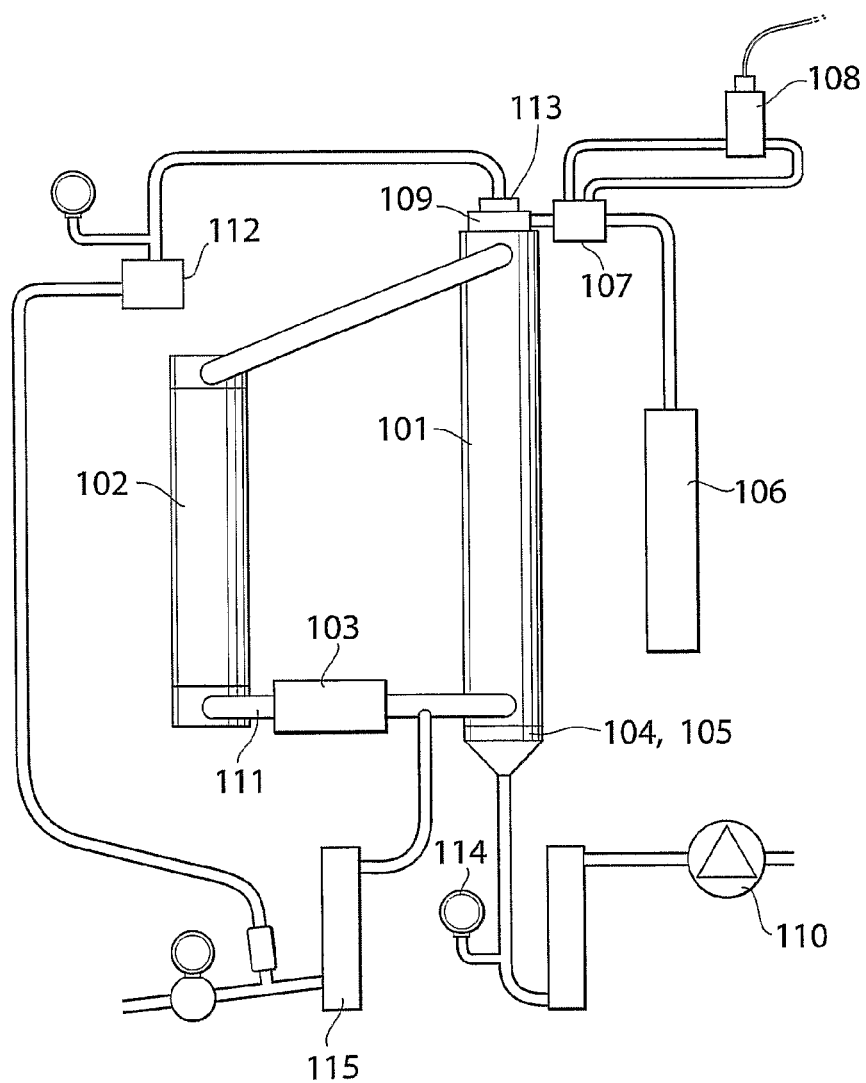

| | | | |
|---|---|---|---|
| 7,607,240 B2 * | 10/2009 | Pinkham et al. | 34/397 |
| 7,954,254 B2 * | 6/2011 | Bussmann et al. | 34/283 |
| 7,966,745 B2 * | 6/2011 | Bedetti | 34/359 |
| 2011/0100560 A1 * | 5/2011 | Gerde | 159/4.04 |
| 2011/0277339 A1 * | 11/2011 | Beyerinck et al. | 34/372 |
| 2012/0167410 A1 * | 7/2012 | Abate et al. | 34/443 |

\* cited by examiner

US 8,347,525 B2

SYSTEM AND METHOD FOR PRODUCING DRY FORMULATIONS

This application is a 371 of PCT/SE2008/051065 filed Sep. 24, 2008 and claims priority under 35 U.S.C. §119 of U.S. Application Ser. No. 60/974,501 filed Sep. 24, 2007.

FIELD OF INVENTION

The present invention relates to a spray drying system and methods of spray drying adapted for making small amounts of powder.

BACKGROUND OF INVENTION

In the early stage of drug development a vast number of new chemical compounds frequently are synthesized, often using pioneering chemistry at considerable effort and expense in order to supply various preclinical test programs with raw material. It is easy to perceive that these newly synthesized materials may appear in both extremely limited quantities and in forms which are difficult to handle. It is therefore a demand to bring such raw drug candidates into a manageable form more adapted to the models already developed for making the initial necessary steps to study their characteristics. A number of general requirements may already generally be set on such a methodology for improving the manageability. The methodology shall increase the dissolution rate of the compound, preferably in an aqueous system. The methodology shall admit low process losses, it shall preferably be operable at ambient temperature and it shall result in a highly defined form of the compound.

A very desirable preclinical model is represented by systems arranging inhalation exposures both for outlining the suitability of drug candidates for pulmonary delivery and for studying clinical and toxicological effects. A suitable such exposure system employing an aerosolized drug candidate is described in the Swedish Patent application No. 0701569-6, while a target pulmonary model is described in U.S. Patent Application No. 60/934,070 and a useful aerosolizing device is described in U.S. Pat. No. 6,003,512. Together, this technology, hereinafter referred to as the dustgun technology, provides a powerful tool in drug development capable of handling low amounts of powdered compound, i.e. in the mg scale. Yet, this technology, allowing an effective deagglomeration of powders, still require a substrate particle size that is smaller or equal to the desired particle size distribution of the generated aerosols. There are several methods available to provide the dustgun system with powders fine enough to allow generation of respirable aerosols including milling, spray drying and supercritical spray drying. Of these methods, conventional spray drying is the one that has the potential to allow production of very small batches of powder with yields high enough for use with very expensive drug candidates. In milling procedures there are too large losses to the vessel walls and for supercritical spray drying the adjustment of the relatively complicated process tend to consume too much substance before a sufficient quality and quantity of the materials have been obtained.

Even with conventional spray drying systems, commercial as well as custom made ones (Lädhe et al., 2006), the production goal is usually in the scale of grams and upward. This is too much for being optimal for the early synthesis steps in preclinical development. To be optimal for utilizing the dustgun system in early drug development a suitable quantity for powder formulation in a spray dryer system would be in the range of 20-100 mg. With such a small production goal it is possible to reach one important advantage over higher capacity system: to remove most of the solvent vapors from the aerosol stream in the drying column before the particles are separated. Most commercial systems with higher production goals rely on using heated drying gas to quickly evaporate the solvent from the particles before separation of particles from the process stream using filters or cyclones (Lädhe et al., 2006). However, the high volumetric flow rate through the apparatuses is unsuitable for production goals around 100 mg. Already at higher production goals the product yield of cyclones is usually considerably lower than 60% (Prinn et al., 2002; Maury et al., 2005). The removal of solvent vapors before direct use of the resulting aerosol for inhalation exposures has been previously described (Pham and Wiedmann, 1999; Wiedmann and Ravichandran, 2001). These systems have relied on diffusional drying by passing the process aerosol through a column with vapor-absorptive material accessible through the perforated walls of the drying column. The draw backs of this system are the complicated method by which the absorptive pellets of the drying column regularly must be changed, and the fact that the absorptive material will be contaminated with the dried substances. Countercurrent drying is commonly used in the food industry for manufacturing of for example powdered milk. However in these examples the product particles are dried by gravitational settling within the ascending dry air stream (Piatkowski and Zbicinski, 2007). The settling rate of the particles must then be on the order of 10 cm/sec, which limit production to particles >50 µm. This countercurrent method cannot be used for pharmaceutical agents with a desired product particle size of <5 µm, where settling speeds are in the range of mm/min. Accordingly, there is need for a spray drying system and system that is adapted for obtaining small quantities of suitably manageable formulation of drug candidates in the form of dry, near solvent free powder, especially a powder with particle size in the range of 1-5 suitable for generating respirable aerosols with the dustgun technology.

The present invention as it is described in the following section aims at providing a dry, solvent free powder from small amounts of raw, freshly synthesized chemical compounds suitable for aerosol generation, but also potentially useful for a number other applications also outside the context of drug development.

DESCRIPTION OF THE INVENTION

It is an object of the present invention to provide a spray drying system adapted to reliable performance of obtaining small amounts of powdered formulations with negligible losses.

It is also an object of the present invention to obtain a spray drying system which overcomes the limits of settling speed associated with conventional counter-current systems.

It is a another object of the invention to provide a spray drying system which admits a suitably extended residence time at ambient temperature, thereby being able to process normally labile agents.

These and other objects will be apparent from the following specification and its appended claims.

The present invention relates in general terms to a spray drying system adapted to provide a composition of dry, or essentially solvent free, particles from a solution of an agent. The process flows described with the system and the method generally are referred to "gas flows" or "air flows" and these terms have been used interchangeable to describe the invention and should within this context mean flowing gas formed media capable of transporting a vaporized solvent which do not interfere with or change the nature of the agents processed by the system. The persons skilled in this technology will readily understand that ambient air, selectively de-humidified, is a useful transport medium, but will find a variety of other media applicable, such as inert gases, exemplified, but limited to, gases like nitrogen and argon as a replacement or a complement to air, for example in certain circumstance when an especially protecting environment is necessary for certain agents. It is generally contemplated that such gases can be treated and transported by means of the invented system and method in a similar way to what has been described for ambient air. In a similar way the inventive system can be operated at temperatures deviating from ambient temperatures, for example with an inert gas at an elevated temperature significantly above room temperature.

The system generally comprises a vertical tube reactor arranged for counter-current removal of solvent from a process flow fed with aerosol droplets of solution descending from the top said reactor with an ascending air flow. The tube reactor comprises a perforated process tube for transportation of the process flow from the outlet of a spray generating device, capable of generating said aerosol droplets of solution, to a dry particle collecting device. Further the tube reactor comprises a membrane sleeve essentially surrounding the peripheral area of said process tube, separating the descending process stream from the ascending air stream. The membrane sleeve is permeable in order to admit diffusion of vaporized solvent from the process stream to the ascending air stream, but prevents convective mixing of ascending and descending flows. Advantageously, the membrane is a thin sheet admitting diffusion of vaporized solvent with a controlled sorbing capacity of the solvent. The solvent will then temporarily be sorbed to the membrane by adsorption or absorption while an equilibrium between sorption and desorption is obtained. Thereby the diffusive capacity from the process flow to the ascending air stream is increased. The membrane sleeves can be treated with agents to modify their sorbing capacity in order to adapt to different solvents having different polarity or other chemical characteristics. In one example, the membrane sleeve may be a thin paper sheet. A paper sheet for obtaining suitable diffusivity and a controlled sorption, at least when water is a solvent, is made from rice paper having a specific weight of about 14 grams per square meter.

The tube reactor also comprises a reactor housing covering said process tube and membrane sleeve, preferably in a sealing manner. The housing is provided with features to introduce the necessary process fluids and to drive the reactor. An aerosol generating device is provided at the top of the reactor and is downwardly directed into the process tube with a liquid chamber for receiving an amount of solution with an agent to be processed to particles. i.e. having an opening located in its bottom part for dispensing aerosol droplets. Preferably the nebulizer is a mesh nebulizer not requiring any feeding gas (as opposed to jet nebulizers). It may also be preferable that vacuum is applied to the liquid chamber, especially if solutions with low surface tension are used or if liquid seep-through with large hanging droplets blocking aerosolization is anticipated. A vacuum of about 2-10 cmvp is normally sufficient to retract the liquid and permitting very short driving cycles. A dynamic vacuum with a pressurized air injector is a practically conceivable method. These arrangements advantageously increases the flexibility of solutions for aerosolization feasible to use with the invention which extends to lipid soluble substances, while permitting excellent control over the aerosolization process, which typically forms aerosol droplets in the size range of 4-20 μm. In this respect, the skilled person perceives that the droplets size depends on the physical and chemical characteristics of the solution.

The system is provided with means to supply inlet air to the tube reactor from an air drying column. This inlet air flow rate measuring device located between said process tube and the air drying column. Preferably, the flow rate measuring device is a precision controlled instrument such as a high resolution pneumotachograph in order to be sufficiently sensitive to register pulses of dispensed aerosol from the nebulizer in the vicinity of the intake of the air flow to the process tube. Accordingly, this function can serve as a surveying control instrument for the drying process, by for example indicating when the nebulizer is empty.

Further, the system comprises a device for introducing inlet air to the perforated process tube; preferably this device provides a laminar process flow comprising descending aerosol droplets. The device is generally annular in crossection, thereby surrounding the nebulizer opening, and is provided with a plurality of outlet orifices arranged along a peripheral area of said device in order to generate a process flow for transporting and directing the aerosol droplets towards a radial center of the process tube. Preferably the inlet orifices are angled and arranged with outlet channels having a major axis offset to a crossectional radius of the inlet air device. In other terms, a longitudinal extension of the orifice channel forms an acute angle with a normal to the surface of the inlet device. Also preferably, the inlet air device has a plurality of orifices evenly distributed around a central part of its peripheral area and creates a tangential flow in the process tube for generating the process flow.

The descending process flow transporting the drying aerosol preferably is generated by a vacuum source connected to the bottom of the process tube. It is preferred that the descending process flow is a laminar flow and that the ascending air flow for removing vaporized solvent from the tube reactor is a laminar flow with a higher flow rate than the descending process flow. The ascending air flow is adapted to perform a swirling motion around the membrane sleeve. For this purpose, the tube reactor has a tangential mouthpiece to generate the ascending air flow; and to further the support a swirling ascending flow, the tube reactor has a tangential outlet for the ascending air flow.

In a special embodiment for reducing aerosol losses to the membrane wall, the ascending air flow is arranged to generate a radial influx of sheath air through the membrane. The influx rate of the radial sheath air, preferably is less than the diffusion rate of vapor through the membrane, i.e. the Peclet number at the membrane is substantially less than 1.

The system preferably is provided with a sealed loop arrangement for recirculating the ascending solvent rich flow and cleaning it from solvent in a column capable of absorbing the solvent, before it can be transported for introduction to the tube reactor. This arrangement includes means for connection to tube reactor and transportation through the solvent stripping column well known in this field of technology, while the solvent absorption material readily can be adapted to the nature of solvent and other process conditions. Generally, the loop arrangement may include a driving fan and preferably a mass flow sensor. In order to establish the ascending air flow which admits a radial sheath air flow, an air injector is provided for introducing a flow of dry air, thereby the ascending air is arranged perform the mentioned swirling convective air stream having a flow rate from at least equal to fifty times higher than the flow rate of the descending process flow. It is generally preferably that the ascending flow has a higher rate than the descending flow. Preferably, the injected air merges with the recirculated flow before entering the tube reactor.

It is an important aspect of the presently invented system that it is arranged for reducing losses of aerosolized material to the membrane wall. For this purpose an electrostatic charge neutralizer, such as a Po-210-source, located in the vicinity of the nebulizer opening. Many other types of neutralizers are conceivable to persons skilled in the art. Also other means to reduce or eliminate material losses have previously been discussed and can be employed separately or in combination when realizing the present invention. The previously described inlet air arrangement to the process tube, the radial sheath air flow and the laminar condition in the inner section of the process tube contribute to increase the yield.

According to another aspect, the present invention relates to a method of preparing a composition of dry, essentially solvent free, particles from a solution of an agent comprising providing a solution of an agent to a device for generating an aerosol; generating a descending process flow in the form of an airstream of aerosolized droplets with a low flow rate in a perforated process tube; generating an ascending air flow for counter-current removal of solvent from said process flow, said ascending flow having substantially higher flow rate than said descending flow; providing a membrane, separating said process stream and ascending air flow, permitting diffusive transport of vaporized solvent through from said process flow to said ascending flow for drying the aerosol; and finally allowing the process flow to descend in the process tube for a time sufficient to substantially remove all solvent vapors before removing the dry particles from said process flow. The aerosolizing equipment can be outlined as previously have been discussed and be subjected to vacuum generating means and the descending and ascending flows are arranged to be laminar flows. For reasons discussed above, it is preferable to carefully monitoring the flow rate of inlet air to the process tube and thereby obtaining process control. Also preferably and earlier discussed, the method comprises a re-circulation step comprising sealingly transporting the solvent-rich ascended air flow leaving the membrane to a solvent absorption column, transporting it through the column for solvent stripping and letting it re-contact the membrane for ascension through the reactor. Preferably, the method comprises tangentially introducing the ascending air flow to the tube reactor, in order to generate a swirling flow around the membrane. The swirling motion can further be supported by tangentially removing the ascended air flow from the tube reactor. According to a special embodiment, suitable to counteract losses of aerosolized material to the membrane, a controlled flow of dry air to the solvent stripped air flow is introduced to the stripped air flow which thereby is arranged to admit a radial sheath air flow through the membrane in opposite direction to the diffusive transport. In order to centrally stabilize the aerosol dispensed from the nebulizer in the process tube a gently rotated inlet air flow is generated by the previously described air inlet device. According to another embodiment, the method further comprises detecting or monitoring the performance of the aerosol generating device by carefully measuring the inlet air flow to the process tube. Advantageously, with constant air flow in the process tube through the dry particle collecting device, the evaporation of each aerosol pulse will manifest itself as a brief low increase in the recorded air flow. Thereby, the performance of the aerosol generating device can be monitored including the emptying of its liquid container. The method further can comprise detecting the flow rate of the solvent stripped flow after the absorption column and monitoring the mass flux of solvent out of the drying column by detecting the concentration in the solvent rich flow before entering the absorption column. The solvent concentration is also measured in the gas stream penetrating the particle collecting device.

With the presently invented system and method, the limiting settling speed for countercurrent drying is circumvented by using a complete flow separation between the aerosol-carrying product stream and the drying stream. The two countercurrent streams are separated with the vapor-permeable barrier or membrane. The membrane or barrier prevents convectional mixing between the gas streams but allows diffusional equilibration of solvent vapor from high to low concentration. Typically the residence time in the process tube is in the range of one min, which is much longer than most existing systems, with residence times in the order of one sec. The countercurrent drying stream has residence times from $\frac{1}{10}^{th}$ to about equal to that of the aerosol stream.

The system and the method as described are useful for producing a dry particle formulation for a number of agents dissolved with suitable solvents. The agent may comprise or consist of a pharmaceutically active compound or a mixture of compounds when applicable.

DETAILED AND EXEMPLIFYING DESCRIPTION

The present invention will now be described in more detail by means of exemplary embodiments and with reference to the accompanying drawings However, the described and depicted embodiments shall not be regarded as limiting for the scope of invention which is set out by the appending claims.

Figure 2:
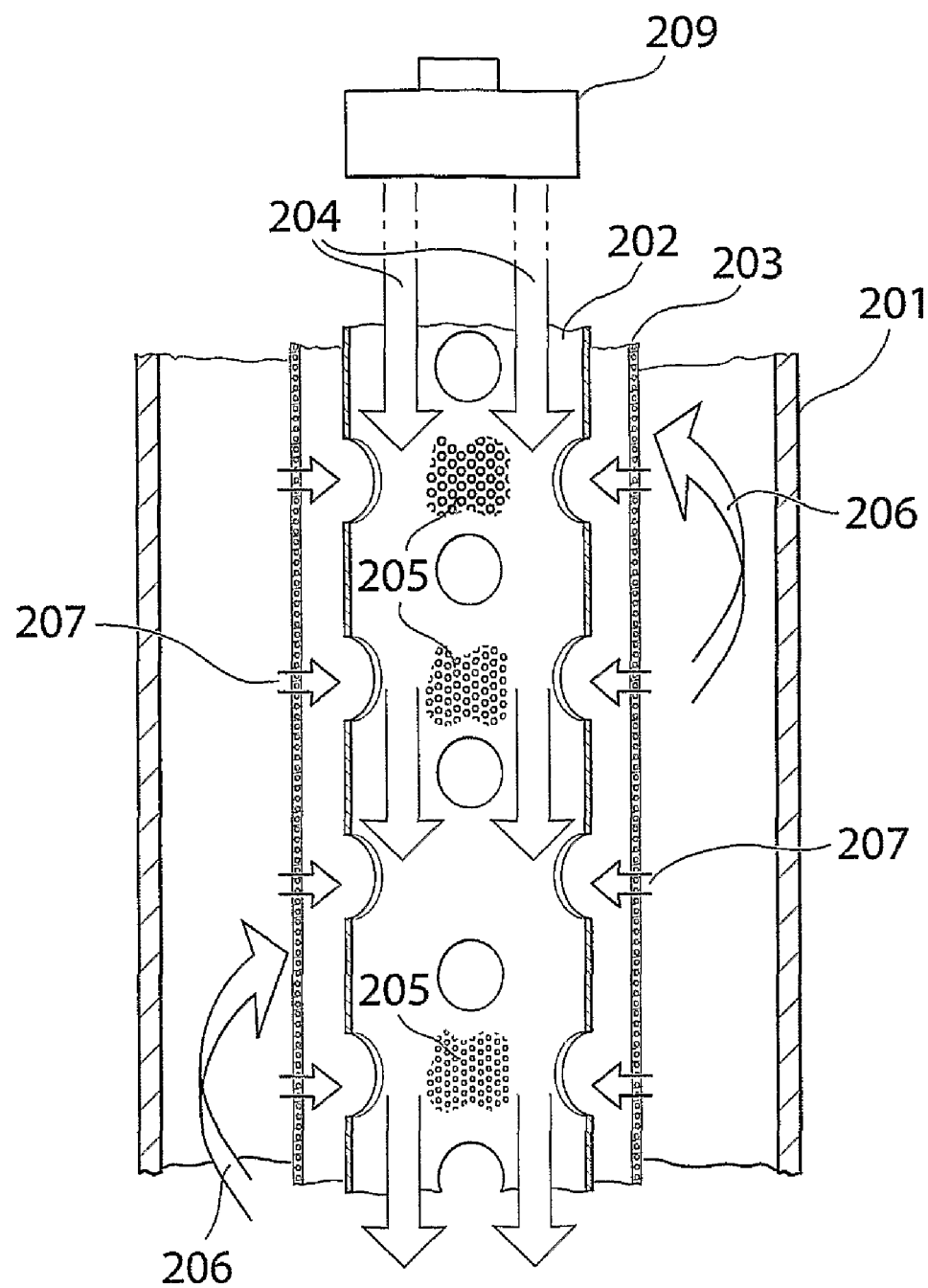

FIG. 1 is a schematic drawing showing a spray drying system, in accordance with an embodiment FIG. 2 is a schematic drawing which shows a longitudinal cross section of the tube reactor.

Figure 3A:
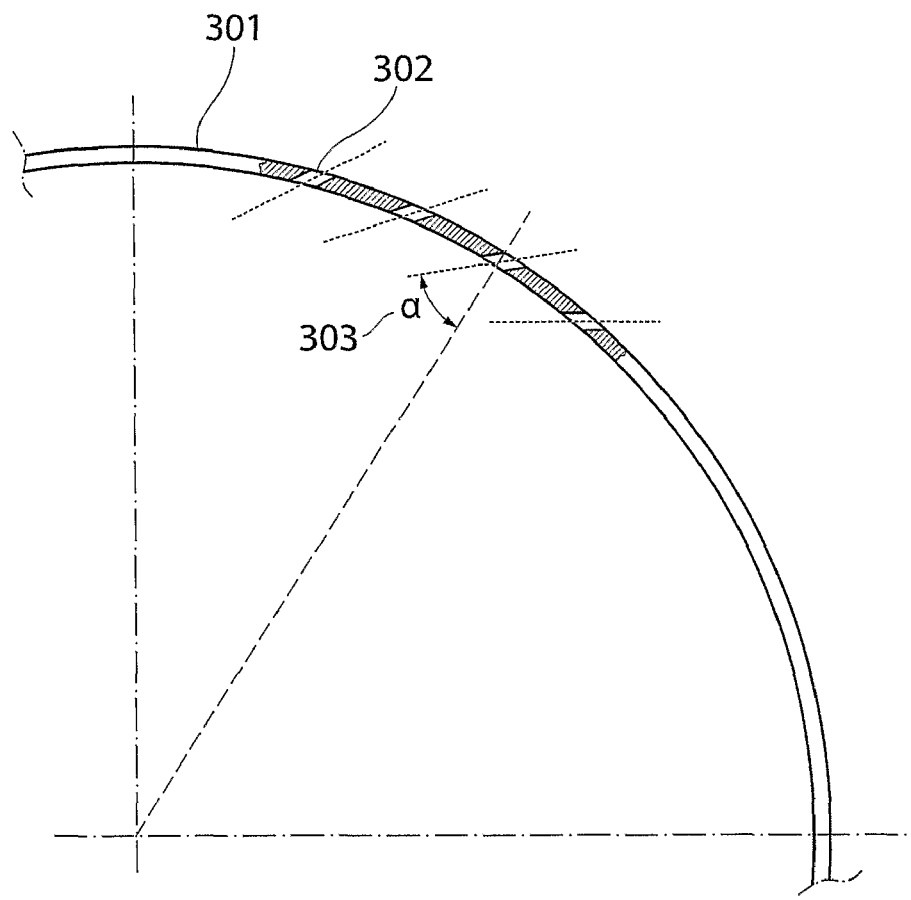

FIG. 3*a* is a schematic drawing which shows a part of the process air inlet, in a crossectional view.

Figure 3B:
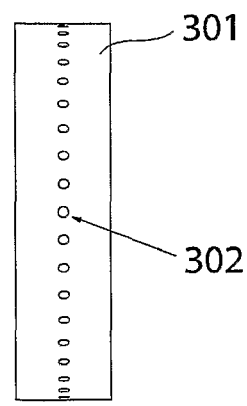

FIG. 3*b* is a schematic drawing which shows the outer periphery of the air inlet device.

Figure 4A:
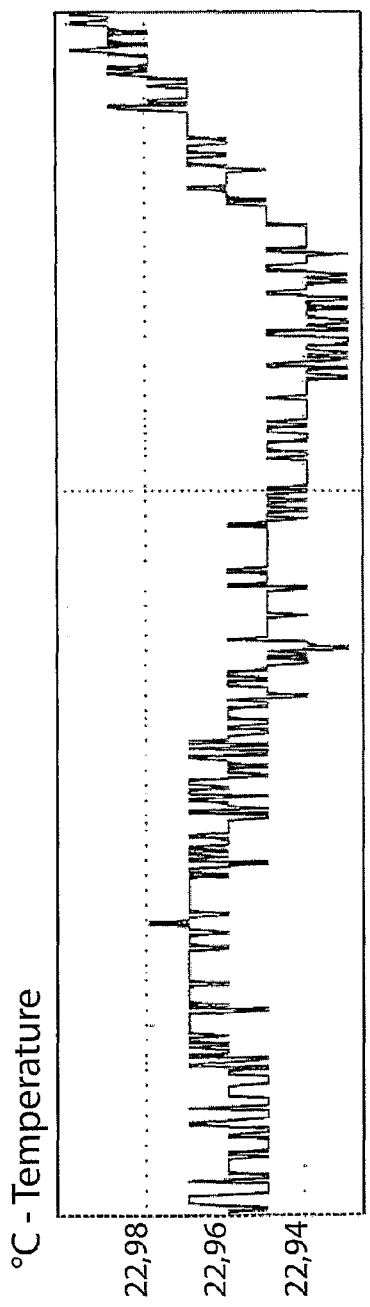
Figure 4A:
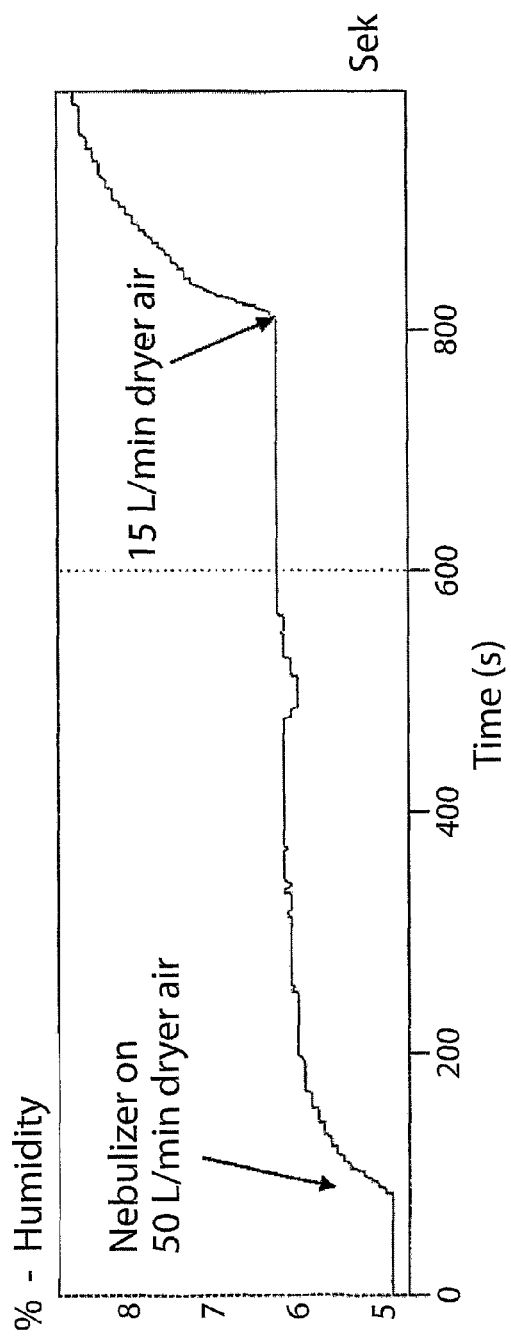
Figure 4B:
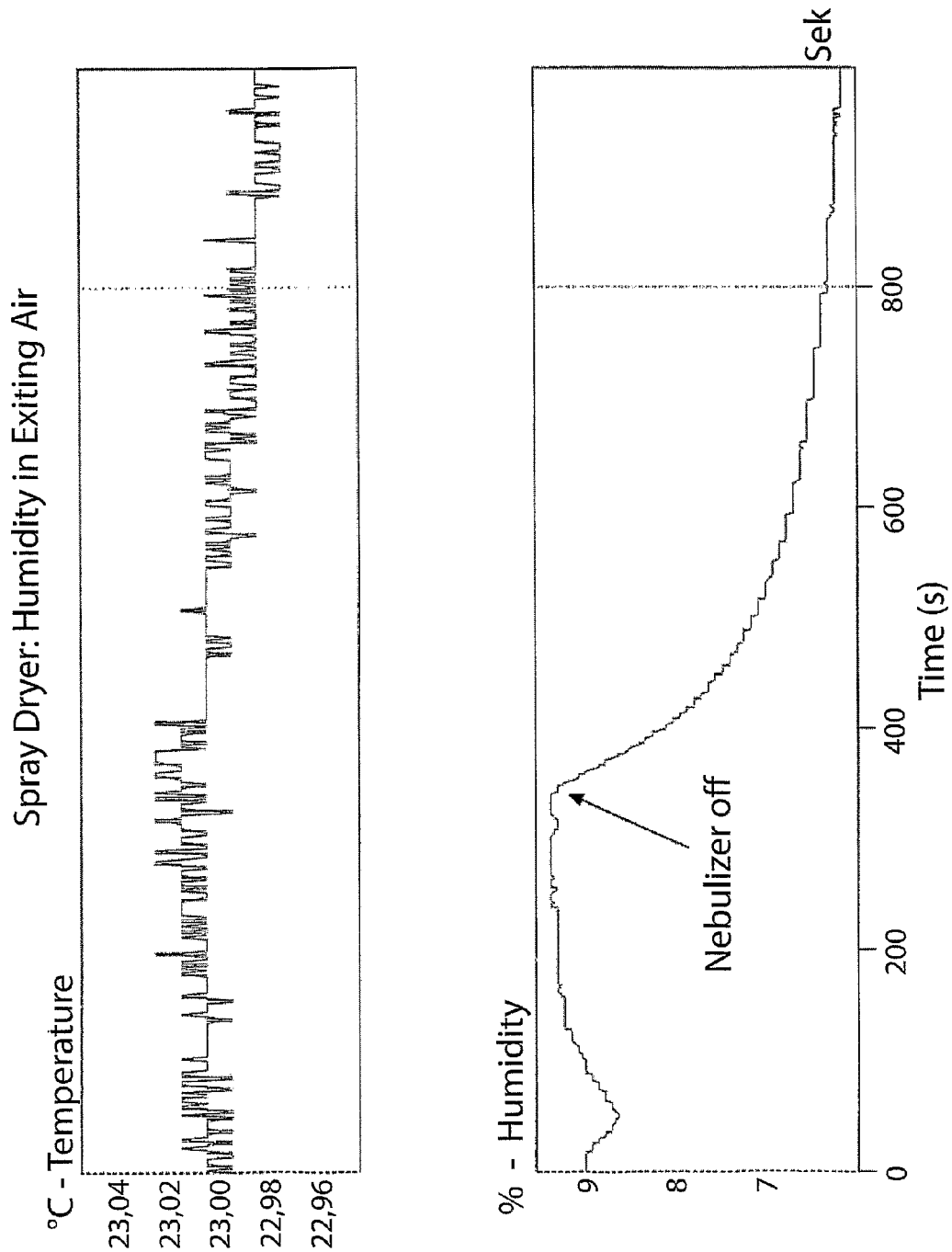

FIGS. 4*a* and 4*b* show water vapor measurements with the spray drying system in operation.

Figure 5A:
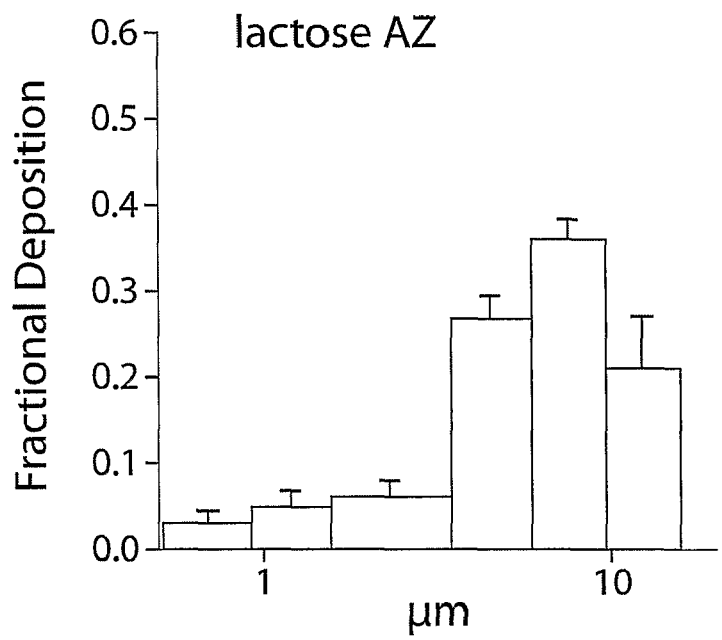
Figure 5B:
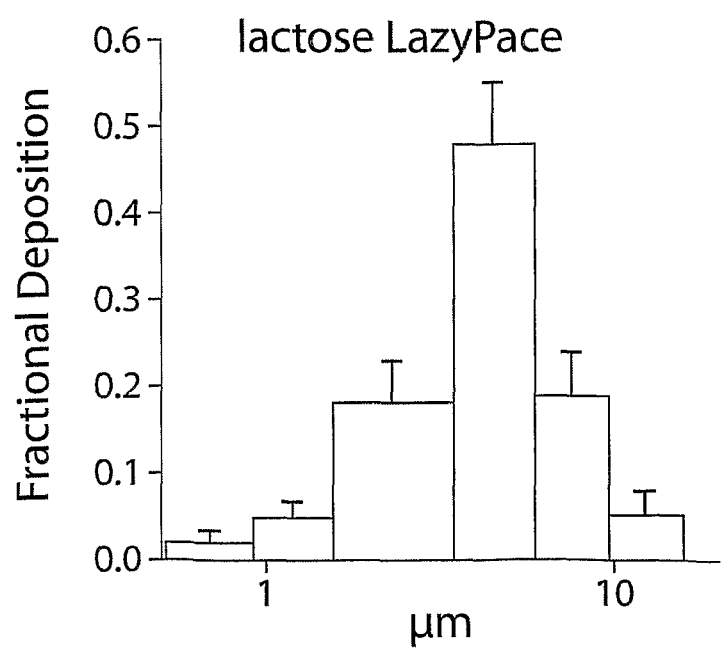

FIGS. 5 and 5*b* shows particle size distribution of lactose after the system has operated on a lactose solution.

The present invention will now be described with reference to FIG. 1.

The spray drying system comprises a generally vertical tube reactor, 101, in which an aerosol of a dissolved agent is dried. Through the tube reactor, 101, there are two flows, where the first one is a descending process flow of gas fed with aerosol droplets. The second flow is a counter-current, ascending airflow, fed into the bottom of the tube reactor, 101, and absorbing the solvent from the process flow. A solvent-absorbing column, 102, is connected to the tube reactor, 101, and a recirculation fan, 103, feeds drying air to the tube reactor, 101, and recirculates it through the solvent-absorbing column, 102.

The system also comprise filter holder, 104, where a filter, 105, collects the dried particles. The process flow is fed to the top of the tube reactor, 101, from an air drying column, 106, via a measuring arrangement consisting of a Fleisch pneumotach, 107, monitored by the pressure transducer, 108. A liquid chamber of the mesh nebulizer 109, (of Aeroneb Lab Type), is filled with the solution to be dried. A vacuumizing arrangement is connected to the filter holder, 104, at the bottom of the tube reactor, 101, and pumps the process flow from the tube reactor, 101 through the filter. The vacuumizing arrangement comprises a vacuum pump, 110, a rotameter and a vacuum gauge, 114. A massflow sensor, 111, is a hot-wire anemometer which detects the flow from the absorption column, 102, and detects the humidity of the drying air. The liquid chamber of the nebulizer (not shown), is vacuumized by connecting a vacuum ejector, 112, to a vacuum lid, 113. An air injector, 115, is adapted to inject some extra drying air into the system.

According to FIG. 2, the spray drying process in the tube reactor, 201 (earlier also referred to as 101), will be described. The tube reactor, 201, comprises a perforated process tube, 202, and a membrane sleeve, 203. A descending process flow of gas, 204, is fed into the process tube, 202, together with aerosol droplets, 205, from the nebulizer, 209 (earlier also referred to as 109). An ascending flow of drying air, 206, from the recirculation fan, 103 (shown in FIG. 1), flows swirlingly along the membrane sleeve, 203. Continuously a vapor of solvent from the aerosolized droplets, 205, passes out through the perforated process tube, 202, diffuses through the membrane sleeve, 203, and is transported by the ascending flow of drying air, 206. Furthermore, an additional controlled influx of dry air from the air injector, 115 (shown in FIG. 1), gives rise to an influx of radial sheath air, 207, through the membrane, 203. This influx prevents aerosolized particles to deposit on the membrane sleeve, 203, and reduces the loss of particles.

According to FIGS. 3a and 3b the inlet device, 301, for inlet air, will be described. The inlet device, 301, surrounds the opening of the nebulizer, 109, and feeds inlet air through a number of holes, 302, equidistantly distributed on the surface. The longitudinal extension of the holes differs from the normal to the surface of the inlet device, 301, with an acute angle α, 303, to give rise to a swirling flow of the inlet air.

The system is intended to dry an amount of powder formulation of 10-500 mg, where the size of the particles is in the range of 1-5 μm. The degree of substance yield is >80%. The size of the aerosol droplets, 205, to be dried is in a range between 4 and 20 μm. In this embodiment the length of the tube reactor, 101, is 900 mm and the diameter of the perforated process tube, 202, is 50 mm. This process tube is surrounded by a membrane sleeve, made of rice paper with a specific weight of 14 g/m$^2$. The air inlet device, 301, is formed like a cylinder, with an outer diameter of 50 mm, a height of 14 mm, and a thickness of material of 1.2 mm. On the surface, 7 mm from the periphery, 40 equidistantly distributed holes through the material, with a diameter of 1.5 mm, is made. To give rise to a gently rotating flow in the region of the nebulizer outlet, the angle between the longitudinal extensions of the holes, 302, through the periphery of the air inlet device, and the normal or radius of the device are 20°. The descending process flow of air, 204, is 1 liter/minute, the ascending flow of drying air, 206, is 30-50 liter/minute and the additional flow of sheath air, 207, is <1 liter/minute. The flows of drying air and sheath air are precision-controlled continuous flows. A vacuum of 2-10 cmvp is supplied to the top of the liquid chamber of the nebulizer. The volume of the absorption column is 4 liters. The aerosol is generated with an Aeroneb Lab mesh nebulizer, 209, working at 4% of its full output. An aerosol with 75% relative humidity can be dried with the system, so the relative humidity in the filter is 5-10%. The flow measuring unit on the process flow is capable to register pulse volumes down to 0.1 μL. The influx rate of sheath air is much smaller than the diffusion rate through the membrane, i.e. the Peclet number at the membrane is substantially less than 1. After passing the drying column the powder is collected on a total filter. The filter cake is gently scraped from the filter with a rubber blade. The remaining powder on the filter can be dissolved in a desirable solvent for further use.

The low vapor concentrations in the drying column should make explosions highly unlikely, and the low liquid evaporation rates giving small amount of vapors in the column at any particular time should render any eventual explosion harmless. At the most there can be 20 mg vapor in the column at any single point. So from an occupational hazard stand point it should not be necessary to use an inert gas in the drying process.

Now referring to FIG. 4a for demonstrating an operation of the inventive spray drying system as exemplified. The figure shows vapor measurement as relative humidity during startup of an Aeroneb nebulizer at a 4% driving cycle (20 ms on, 480 ms off). The absorption column flow rate was 50 L/min during the first part of the test, but was lowered to 15 L/min after 800 sec. The humidity increased as expected because of being diluted into a smaller volume of air. A mass balance over the drying column and later verified by humidity measurements indicates that more than 90% of the water entering the drying column with the nebulized solution is removed before the particles reaches the bottom filter. FIG. 4b shows the drying out of the drying column after the nebulizer is turned off. The absorption column flow rate is 15 L/min.

FIGS. 5a and b shows an example of a lactose powder that has been dissolved and dried again with the exemplified spray drying system as a 10% solution in water. The Aeroneb nebulizer was working at 4% of its full output. Both powder samples were aerosolized with the dustgun aerosol generator (Ewing et al., 2008) and had the particle size distribution characterized with a Marple cascade impactor (Rubow et al., 1987). FIG. 5a shows that the milled lactose (obtained from AstraZeneca) has mean particle size (MMAD) of 7.0 micrometers and that the spray dried lactose with the inventive, exemplified system has a mean particle (MMAD) of 4.7 micrometers (FIG. 5b). The yield of 100 mg 10 mg solution of lactose was 75%.

Reduction of aerosol losses to the membrane-coated wall of the aerosol section in the drying column is accomplished in four ways:

1) The electrostatic charge of the freshly generated aerosols is neutralized with Po-210 sources at the nebulizer end of the column.
2) A laminar flow configuration is used in the column. The Reynolds number of the inner section of the column is about 30 which is well below the beginning of the turbulent transition range at 2100. The flow configuration in the annular drying air flow is also well into the laminar flow range.
3) The carrier gas at the nebulizer is gently rotated into the column around the mouth of the nebulizer in order stabilize the flow around the aerosol puffs and keep them centered in the column, while the kinetic energy from the nebulizer is dissipating.
4) In the rest of the column a novel radial sheath air method is used.

In order to obtain the radial sheath air flow and reduce losses in the system, a controlled dry air stream is added to the external drying air circulation of the system immediately before the bottom inlet to the drying tower. A number of design considerations are now discussed. Injecting clean air in an axial direction as an annulus surrounding an aerosol stream at the inlet end of tubular columns to reduce wall losses of aerosol has been used for many years (Mirme et al., 2007). Because the drying air circulation is completely closed to the ambient air, a controlled influx of sheath air into the aerosol section through the membrane can be accomplished. In is the intent to use the membrane as a diffusor for the sheath air flux so that incoming sheath air will be evenly distributed over the inside of the membrane-covered tube. By doing so the wall losses of aerosol before depositing on the filter can be further reduced. The rate of the radial influx of sheath air will be much slower than the radial out flux of vapor by molecular diffusion, a relation that can be characterized by the so called Peclet Number (Bird et al., 1960). The Peclet number (Pe) is the ratio between movement by convection and movement by diffusion for a substance in a streaming gas or liquid; Pe=L*V/D, where L is the characteristic length (m), V is the flow velocity (m/s), and D is the molecular diffusivity of the vapor molecules (m$^2$/s). In the current system the characteristic length is the wall thickness of the perforated tube or 1 mm. The flow velocity is the sheath air flow through the tube wall divided by the total perforated hole area. A typical diffusivity for vapor molecules in air at 20° C. is about $1\times10^{-5}$ (m$^2$/s). At a sheath air flow of 0.3 L/min the Pe number at the membrane will be approximately 0.01, which is much smaller than 1. With Pe number smaller than one the movement by diffusion dominates over movement by convection, so diffusion out of the membrane will be much faster than the air movement into the membrane with the sheath air. However using the same definition for the diffusion of the drying particles gives a Pe>>1 indicating that the air movement instead will dominate over particle diffusion and thus push the particle away from the tube walls. For 1 μm particles the diffusivity in air is approximately $3\times10^{-11}$ (m$^2$/s). For such particles the Peclet number at the membrane will be about 2000, which will be in the lower range for typical aerosols dried.

The described system has three advantages; I) the separated powder product is easier to handle when it contains only small amounts of remaining solvent, and II) the system relies on residence times in the drying column of minutes instead of seconds as most existing designs. Longer residence times enable drying of particles at room temperature. Therefore, thermolabile substances such as proteins and peptides can be dried using the standard method. III) In countercurrent drying separate columns can be used for the vapor absorption material; activated carbon or drierite. The absorption material will not be contaminated by direct contact with the spray product, and can thus be easily regenerated.

REFERENCES

Bird R B, Stewart W E and Lightfoot E N (1960) *Transport Phenomena*. John Wiley & Sons, New York.
Ewing P, Eirefelt S, Andersson P, Blomgren A, Ryrfeldt Å and Gerde P (2008) Short inhalation exposures of the isolated and perfused rat lung to respirable dry particle aerosols; the detailed pharmacokinetics of budesonide, formoterol and terbutaline. *J Aerosol Med* 21:1-12.
Lädhe A, Raula J, Kauppinen E I, Watanabe W, Ahonen P P and Brown D P (2006) Aerosol synthesis of inhalation particles via a droplet-to-particle method. *Particle Science and Technology* 24:71-84.
Maury M, Murphy K, Kumar S, Shi L and Lee G (2005) Effects of process variables on the powder yield of spray-dried trehalose on a laboratory spray-dryer. *Eur J Pharm Biopharm* 59:565-573.
Mirme A, Tamm E, Mordas G, Vana M, Uin J, Mirme S, Bernotas T, Laakso L, Hirsikko A and Kulmala M (2007) A wide-range multi channel air ion spectrometer. *Boreal Environment Research* 12:247-264.
Pham S and Wiedmann T S (1999) Analysis of a diffusion dryer for the respiratory delivery of poorly water soluble drugs. *Pharm Res* 16:1857-1863.
Piatkowski M and Zbicinski I (2007) Analysis of the mechanism of counter-current spray drying. *Transport in Porous Media* 66:1573-1634.
Prinn K B, Costantino H R and Tracy M (2002) Statistical modeling of protein spray drying at the lab scale. *AAPS PharmSciTech* 3:E4.
Rubow K L, Marple V A, Olin J and McCawley M A (1987) A personal cascade impactor: design, evaluation and calibration. *Am Ind Hyg Assoc J* 48:532-538.
Wiedmann T S and Ravichandran A (2001) Ultrasonic nebulization system for respiratory drug delivery. *Pharm Dev Technol* 6:83-89.

The invention claimed is:

1. A spray drying system adapted to provide a composition of dry, or essentially solvent free, particles from a solution of an agent, comprising a generally vertical tube reactor arranged for counter-current removal of solvent from a process flow fed with aerosol droplets of solution descending from the top of said reactor with an ascending gas flow, wherein the tube rector comprises:
    (i) a perforated process tube for transportation of the process flow from the outlet of an aerosol generating device, capable of generating said aerosol droplets of solution, to a dry particle collecting device;
    (ii) a membrane sleeve essentially surrounding the peripheral area of said process tube, separating the descending process flow from the ascending gas flow while admitting diffusion of vaporized solvent from the process stream to the ascending gas stream; and
    (iii) a reactor housing sealingly covering said process tube and membrane sleeve being provided with means for introducing and/or removing the process fluids.

2. A system according to claim 1, wherein the aerosol generating device located at the top of the tube reactor is a downward acting mesh nebulizer, provided with an opening in its bottom part for dispensing aerosol droplets to the process tube.

3. A system according to claim 1, wherein the liquid chamber of the mesh nebulizer receiving the solution of agent is connected with means to establish a pressure below ambient pressure in said chamber.

4. A system according to claim 2, wherein the aerosol droplets are in the size range of 4-20 μm.

5. A system according to claim 1, wherein the membrane sleeve is a thin sheet admitting diffusion of the solvent from process flow to the ascending flow, preferably said membrane has a controlled solvent sorbing capacity; more preferably said sheet is paper sheet having a specific weight of about 14 grams per square meter.

6. A system according to claim 1, provided with means to supply inlet gas to the tube reactor from a gas drying column, said means comprising an inlet flow rate measuring device located between said process tube and said gas drying column.

7. A system according to claim 6, further comprising a device introducing inlet gas to the perforated process tube adapted to provide a laminar process flow comprising descending aerosol droplets.

8. A system according to claim 7, wherein the device is generally annular in cross-section, thereby surrounding the nebulizer opening, and is provided with a plurality of outlet orifices arranged along a peripheral area of said device in order to generate a process flow for transporting and directing the aerosol droplets towards a radial center of the process tube.

9. A system according to claim 8, wherein the orifices are angled and arranged with outlet channels having a major axis offset to a cross-sectional radius of the inlet gas device.

10. A system according to claim 1, wherein the process flow is generated by a vacuum source connected to the bottom of the process tube.

11. A system according to claim 1, wherein the ascending gas flow is a laminar flow with a higher flow rate than the descending process flow.

12. A system according to claim 11, wherein the ascending gas flow is adapted to perform a swirling motion around the membrane sleeve.

13. A system according to claim 12, wherein the tube reactor has a tangential mouthpiece to generate the ascending gas flow.

14. A system according to claim 12, wherein the tube reactor has a tangential outlet for the ascending gas flow.

15. A system according to claim 12, wherein the ascending gas flow generates a radial influx of sheath gas through the membrane.

16. A system according to claim 15, wherein influx rate of the radial sheath gas is less than the diffusion rate of vapor through the membrane, i.e. the Peclet number at the membrane is substantially less than 1.

17. A system according to claim 15, comprising a gas injector for adding a flow of dry gas to the ascending gas stream enters into the reactor and for generating the radial sheath flow.

18. A system according to claim 1, comprising means to connect the solvent-rich ascending gas flow arriving from the reactor to a solvent absorption column, transporting it through the column for solvent stripping and letting it re-enter the reactor for ascension through the reactor.

19. A system according to claim 1, wherein the flow rate of the ascending gas flow is substantially higher than the descending process flow.

20. A system according to claim 19, wherein the ascending flow has a flow rate from about ten times the value of the descending flow rate to about an equal flow rate value of the descending rate.

21. A system according to claim 2, comprising an electrostatic charge neutralizer located in the vicinity of the opening of the aerosol generating device.

22. A method of preparing a composition of dry, essentially solvent free, particles from a solution of an agent comprising the steps of:
  (i) providing a solution of an agent to a device for generating an aerosol;
  (ii) generating a descending process flow in the form of a gas stream of aerosolized droplets with a low flow rate in a perforated process tube;
  (iii) generating an ascending gas flow for counter-current removal of solvent from said process flow, said ascending flow having substantially higher flow rate than said descending flow;
  (iv) providing a membrane, separating said process stream and ascending gas flow, permitting diffusive transport of vaporized solvent through from said process flow to said ascending flow for drying the aerosol; and
  (v) allowing the process flow to descend in the process tube for a time sufficient to substantially remove all solvent vapors before removing the dry particles from said process flow.

23. A method according to claim 22, wherein both descending and ascending flows are laminar.

24. A method according to claim 22, comprising sealingly transporting the solvent-rich ascended gas flow leaving the membrane to a solvent absorption column, transporting it through the column for solvent stripping and letting it re-contact the membrane for ascension through the reactor without generating a radial flow of gas through the membrane.

25. A method according to claim 22, comprising sealingly transporting the solvent-rich ascended gas flow leaving the membrane to a solvent absorption column, transporting it through the column for solvent stripping and letting it re-contact the membrane for ascension through the reactor, while introducing a controlled flow of dry gas to the solvent stripped gas flow to generate a corresponding radial inflow of sheath gas through the membrane.

26. A method according to claim 25, wherein the ascending gas flow is arranged to admit a radial sheath flow through the membrane in opposite direction to the diffusive transport.

27. A method according to claim 24, comprising tangentially introducing the ascending gas flow to the tube reactor in order to generate a swirling flow around the membrane.

28. A method according to claim 22, comprising tangentially removing the ascended gas flow from the tube reactor.

29. A method according to claim 22, comprising generating a gently rotating inlet gas flow to the process tube for centrally stabilizing the aerosol dispensed from the aerosol generating device.

30. A method according to claim 22, comprising detecting or monitoring the performance of the aerosol generating device by carefully measuring the inlet gas flow to process tube.

31. A method according to claim 24, comprising detecting and controlling the flow rate of the solvent stripped flow after the absorption column.

32. A method according to claim 24, comprising monitoring the total mass balance of solvent in the system by balancing the disappearance of solvent from the nebulizer against the total outbound flux of solvent from the tube reactor.

33. A method according to claim 32 comprising detecting the solvent concentration and flow rates in:
  (i) the solvent-containing flow before the absorption column, and (ii) the effluent gas stream after the particle-collecting device.

* * * * *